UNITED STATES PATENT OFFICE.

WILLIAM A. HALL, OF BELLOWS FALLS, VERMONT, ASSIGNOR TO THE CASEIN COMPANY OF AMERICA, OF NEW JERSEY.

PROCESS OF MAKING SOLUBLE CASEIN.

SPECIFICATION forming part of Letters Patent No. 664,318, dated December 18, 1900.

Application filed October 20, 1899. Serial No. 734,189. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Processes of Producing Food Products, of which the following is a specification, reference being had therein to the accompanying drawings.

This invention or discovery relates to a process for making a casein food product which may be used as a substitute for eggs in cooking and which is perfectly soluble in hot or cold water or in milk, so that it may be dissolved before being mixed with flour and other ingredients in making various articles of food.

United States Patent No. 603,165, granted to Alexander Bernstein April 26, 1898, and now owned by me, describes a process of producing a substitute for eggs comprising coagulated milk-albumen and casein, and with which ingredients a farinaceous curd may also be intermingled. In producing the Bernstein product the casein and albumen are ground until the mass assumes the form of a thick paste, in which condition it is capable of being beaten up in milk or water to form an emulsion, which can be added to the dough in the same way that beaten eggs are. If it be desired to preserve the Bernstein product for considerable periods of time, the paste is dried and then reduced to a powder, and this is the preferable commercial form of the product. This product makes an admirable substitute for eggs in that it is chemically nearly or exactly the same as eggs, and when used in cooking the resulting products cannot be distinguished from similar products in the making of which eggs have been employed. This Bernstein product, however, is open to one serious objection in that it is not soluble and can only be mixed mechanically with the articles of food in which it is incorporated, and while the users of the product who preferably mix the egg-substitute powder with flour and other ingredients in a dry state do not object to the Bernstein product on this ground there are many bakers who wish first to dissolve the products in a certain amount of milk or water who do object to it, while others object to using any product which is insoluble. The Bernstein product cannot be made soluble, as there is no known solvent for the milk-albumen which it contains. I have discovered that a casein substitute for eggs which is perfectly soluble may be produced from milk if only the casein of the milk be coagulated. In the practice of the Bernstein process the albumen is coagulated by heating the whey to a temperature exceeding 187° Fahrenheit or, as is stated in the Bernstein patent, by boiling the whey, and this heating or boiling of the milk or whey to a temperature high enough to coagulate the albumen I carefully avoid.

In producing my soluble-casein egg substitute I first precipitate the casein from the milk preferably by hydrochloric, sulfuric, or acetic acid. Rennet may also be used; but in such case an objectionable amount of alkali would be necessary in treating the curd subsequently. I then wash the precipitated curd to extract the whey and excessive acid and dry it out at a temperature low enough not to burn it, preferably below 140° Fahrenheit. I then grind or otherwise reduce this product to a fragmentary condition about the size of rice. It is then in a very hygroscopic state and is in a condition to absorb a large amount of water. I then place this granulated casein in a suitable mixing or agitating machine and add to it, while the curd is being rapidly agitated, about ten per cent., more or less, by bulk or weight, of a saturated solution of alkali, preferably carbonate of soda, although borax or a mixture of borax and soda might be used. This solution is immediately absorbed by the granular casein, so that although only a small part of the absorptive capacity of the curd for the solution is supplied each particle of the granular curd is impregnated and permeated with the alkali, so as to render it soluble, and as the granular curd is at this time being thoroughly agitated it does not cake together. After this mixing process has continued for about twenty minutes the granular casein is removed from the mixing-machine and when thus removed is then much the same in appearance as it was when it went in, although it is quite hot from the rapid absorption of the alkali. It is now spread out and dried and is then in a suitable condition for being packed for shipment.

The product of this process does not differ, essentially, in appearance from ordinary ground casein, as the alkali is all taken up by obsorption and there is no appearance of powdered alkali about the mass. This product will keep without decomposing or changing for any considerable length of time, and it may be readily dissolved in hot or cold water or in milk. It has an enormous absorptive capacity, so that one pound will take up some three or four pounds of water to practical dryness, while the alkali prevents any cheesy odor from arising.

I have found that in producing this casein product by the process above described much less alkali is needed for making it soluble than would be necessary if the alkali were simply ground in, and there is no practical objection to the small percentage of alkali, particularly if it be carbonate of soda. If, however, any one objects to the alkaline reaction, the product can be given a neutral or even an acid reaction by adding a little boracic acid to the alkaline solution.

This casein product can be colored yellow to suit any particular trade by adding any soluble butter color, as arnotto or other substances used for coloring butter, to the alkaline solution, and when added in this manner the color will be taken up by the granular particles, so as to give them the desired appearance.

This product when used in baking serves precisely the same purpose as is served by eggs and makes a cheap and admirable substitute therefor, as it has been found that one pound of the dried product will take the place of about six dozen eggs.

I do not herein claim the product of the above-described process, as such product is claimed in my application, Serial No. 730,241, filed September 12, 1899.

Having thus described my invention or discovery, I claim and desire to secure by Letters Patent—

1. The herein-described process of making soluble casein in dry commercial form, consisting in first precipitating the curd from milk, then washing the curd to eliminate the whey and excess of precipitant, then drying the curd by a gentle heat but at a temperature low enough not to burn it, then reducing the curd to a granular condition, then causing the granulated curd to absorb a small percentage of a solution of an alkali by mixing the said solution with the granular curd while the latter is being rapidly agitated, and finally drying the granulated and alkalized product.

2. The herein-described step in the process of making soluble alkalized casein, consisting in causing the curd, when in a fragmentary condition, to absorb a small percentage of its bulk or weight of a solution of an alkali by mixing the said solution with the fragmentary curd while the latter is being rapidly and thoroughly agitated, so that each fragment will be permeated with said solution.

In testimony whereof I affix my signature in the presence of two witnesses.

WILLIAM A. HALL.

Witnesses:
   CUSHING ADAMS,
   P. F. DANFORTH.